US010229602B2

(12) United States Patent
Marueli

(10) Patent No.: US 10,229,602 B2
(45) Date of Patent: Mar. 12, 2019

(54) SYSTEM FOR NAVIGATING DRIVERS TO SERVICE TRANSPORTATION REQUESTS SPECIFYING SIGHTSEEING ATTRACTIONS

(71) Applicant: GT Gettaxi Limited, Limassol (CY)

(72) Inventor: Sunny Marueli, Nes Ziona (IL)

(73) Assignee: GT Gettaxi Limited, Limassol (CY)

(*) Notice: Subject to any disclaimer, the term of this patent is extended or adjusted under 35 U.S.C. 154(b) by 0 days.

(21) Appl. No.: 15/055,743

(22) Filed: Feb. 29, 2016

(65) Prior Publication Data
US 2017/0249847 A1 Aug. 31, 2017

(51) Int. Cl.
*G06Q 10/06* (2012.01)
*G08G 1/00* (2006.01)
*G01C 21/34* (2006.01)
*G06Q 50/14* (2012.01)

(52) U.S. Cl.
CPC ........... *G08G 1/202* (2013.01); *G01C 21/343* (2013.01); *G01C 21/3476* (2013.01); *G06Q 10/06311* (2013.01); *G06Q 50/14* (2013.01)

(58) Field of Classification Search
CPC .......... G06F 9/46; G06F 15/163; G08G 1/096
See application file for complete search history.

(56) References Cited

U.S. PATENT DOCUMENTS

| | | | | |
|---|---|---|---|---|
| 5,819,227 A * | 10/1998 | Obuchi | .............. | G01C 21/3423 701/117 |
| 5,948,040 A * | 9/1999 | DeLorme | ............... | G01C 21/36 340/990 |
| 6,085,148 A * | 7/2000 | Jamison | ................. | G01C 21/00 342/357.31 |
| 7,783,511 B2 * | 8/2010 | Sridharan | .............. | G06Q 10/06 705/7.13 |
| 9,195,765 B2 * | 11/2015 | Russell | ............... | G06F 17/3087 |
| 2005/0114190 A1 * | 5/2005 | Pandit | .................. | G06Q 10/047 705/7.26 |
| 2015/0153191 A1 * | 6/2015 | Ma | ......................... | G01C 21/34 701/426 |
| 2016/0018969 A1 * | 1/2016 | Sundarraman | .......... | H04L 67/18 715/747 |

* cited by examiner

Primary Examiner — Alex C Dunn
(74) Attorney, Agent, or Firm — Lowenstein Sandler LLP

(57) ABSTRACT

In one embodiment a transportation request for a sightseeing trip is received from a computing device of a passenger, wherein the transportation request identifies a plurality of sightseeing attractions. One or more drivers are selected, based on availability data associated with a plurality of drivers, to transport the passenger to the plurality of sightseeing attractions. Navigational data is transmitted to the one or more drivers to enable the one or more drivers to transport the passenger to the plurality of sightseeing attractions.

20 Claims, 6 Drawing Sheets

SYSTEM FOR NAVIGATING DRIVERS TO SERVICE TRANSPORTATION REQUESTS SPECIFYING SIGHTSEEING ATTRACTIONS

TECHNICAL FIELD

This disclosure relates in general to the field of mobile applications and, more particularly, to a system for navigating drivers to service transportation requests specifying sightseeing attractions.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
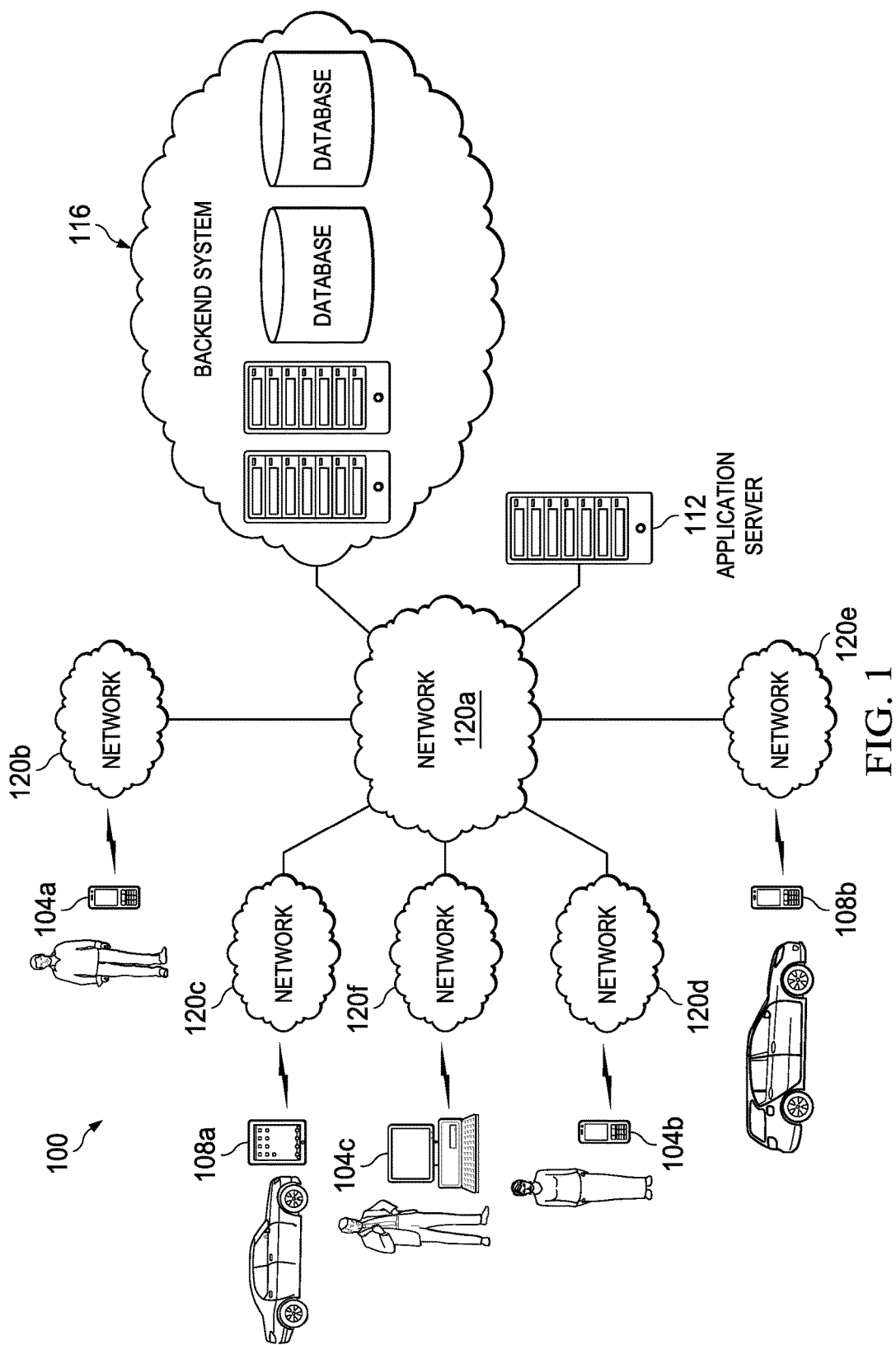
FIG. 1 illustrates a block diagram of a system for navigating drivers to service transportation requests specifying sightseeing attractions in accordance with certain embodiments.

In one embodiment a transportation request for a sightseeing trip is received from a computing device of a passenger, wherein the transportation request identifies a plurality of sightseeing attractions. One or more drivers are selected, based on availability data associated with a plurality of drivers, to transport the passenger to the plurality of sightseeing attractions. Navigational data is transmitted to the one or more drivers to enable the one or more drivers to transport the passenger to the plurality of sightseeing attractions.
Example Embodiments FIG. 1 illustrates a block diagram of a system 100 for selecting drivers for transportation requests specifying sightseeing attractions in accordance with certain embodiments.

Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of passengers and drivers associated with a transportation service by allowing a user to receive recommendations on sightseeing attractions from a transportation service, allowing the user to construct a transportation request specifying various sightseeing attractions, providing contextual data (such as audio or video information) associated with the sightseeing attractions, and arranging for one or more drivers to fulfill the transportation request. Various embodiments may provide technical advantages such as minimizing fuel or power used to service transportation requests due to optimized travel routes and/or shared rides, minimizing communication between a transportation service and its drivers to fulfill transportation requests, and quick arrangement and communication to a passenger of details associated with a transportation request.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), or car preference information (e.g., what models or color of car the user prefers).

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's device is not logged in to the transportation service through the driver application), or the driver may be "inactive," meaning that the driver only desires to receive particular requests meeting certain exception criteria.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 or application server 112 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
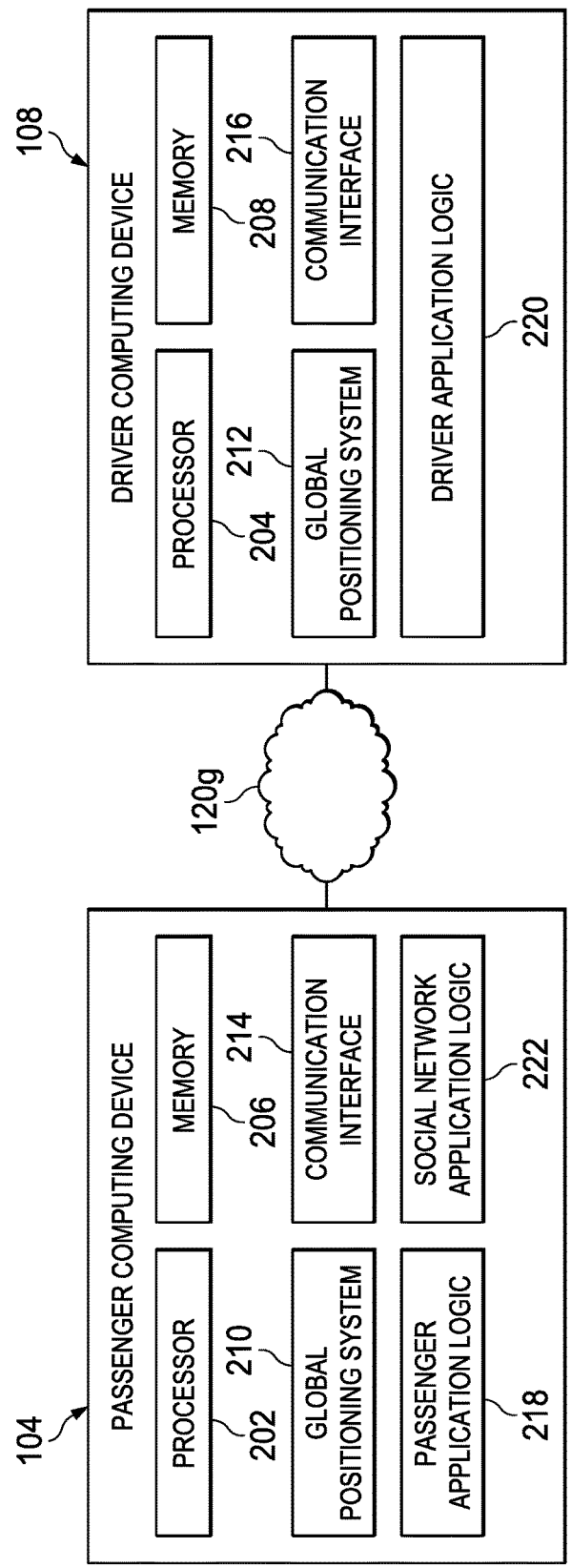
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber that has registered an account with the transportation service or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processor 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the passenger application described herein. Similarly, application logic 220 may include logic providing, at least in part, the functionality of the driver application described herein. In a particular embodiment, the logic of devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the passenger application, application logic 218 may provide additional features for the passenger application to enhance a passenger's experience.

In various embodiments, application logic 218 may provide an interface allowing a passenger to generate a transportation request for a sightseeing trip specifying a plurality of sightseeing attractions. A sightseeing attraction may be any suitable destination that may be of special interest to local residents or tourists. In various embodiments, a location may be designated as a sightseeing attraction by the transportation service or another service (e.g., a sightseeing attraction information source) based on a record of a number of visits made to the location, user reviews associated with the location, or other suitable information. Logic 218 may present information associated with a plurality of sightseeing attractions to the passenger. The information may be obtained by logic 218 in any suitable manner. For example, logic 218 may request the information from backend system 116 or other sightseeing attraction information source, such as a travel website or other service (e.g., TripAdvisor, Yelp, etc.). In various embodiments, logic 218 may receive input (e.g., a voice command or a touch of an icon displayed on a display of the passenger computing device) from the passenger requesting a sightseeing trip and may request the information from backend system 116 or other source in response to the passenger's input.

The information associated with the sightseeing attractions may be presented in any suitable manner. In an embodiment, each sightseeing attraction presented to the user may be presented in a sightseeing attraction entry. An entry may include any suitable information associated with a sightseeing attraction. For example, an entry may include a location of the sightseeing attraction, a distance of the sightseeing attraction from the current location of the passenger (or other location specified by the passenger), an estimated travel time of the sightseeing attraction from the current location of the passenger (or other location specified by the passenger), one or more ratings (or an average rating) associated with the sightseeing attraction, a recommended viewing time associated with the attraction (e.g., an average time spent by other passengers or viewers at the attraction or an average of recommended viewing times specified by other passengers or users of another service), an opening and/or closing time of the attraction, a cost to attend the attraction (or an indication that the attraction is free), whether tickets are available for the attraction, whether a ticket can be purchased through the application logic 218 (e.g., via an account of the passenger with the transportation service), a brief description of the attraction, or other suitable information associated with the attraction.

In particular embodiments, a passenger may specify search constraints for sightseeing attractions via application logic 218. For example, a search may specify one or more types of attractions (e.g., shopping malls, restaurants, historical buildings or landmarks, museums, scenic views, hiking trails, etc.), a particular location, a maximum distance or travel time from a particular location, a minimum rating for an attraction, a minimum or maximum viewing time associated with the attraction, a maximum price for an attraction, one or more times to be compared against opening and/or closing times of an attraction (i.e., to identify attractions that will be open during the passenger's sightseeing trip), ticket availability for an attraction (e.g., the passenger may request attractions for which tickets are available), ticket purchasability options (e.g., the passenger may request attractions for which tickets can be purchased through the application logic 218, e.g., via an account of the passenger with the transportation service), other suitable criteria which may be used to filter sightseeing attractions, or any suitable combination thereof. The search constraints may be transmitted by the passenger computing device to the backend system 116 or other sightseeing attraction information source which may then apply the search constraints to limit the sightseeing attractions that are sent to the passenger computing device for presentation to the passenger. In various embodiments, the backend system 116 or other sightseeing attraction information source may apply one or more search constraints (such as those described above or other search constraints) that are not explicitly specified by the passenger (alone or in conjunction with one or more search constraints that are specified by the passenger) to a set of sightseeing attractions to limit the size of a list of sightseeing attractions that are returned to application logic 218 for presentation to the passenger. As just one example, the backend system 116 or other sightseeing attraction information source may limit the sightseeing attractions presented to the user to sightseeing attractions that are near (e.g., in the same city as or other region of) a location of the passenger computing device (or another location specified by the passenger).

In various embodiments, the backend system 116 and/or the application logic 218 may order the presentation of the sightseeing attractions based on one or more of the search constraints. For example, the sightseeing attractions may be ordered such that the sightseeing attractions that are closest to the location of the passenger may be presented first. As another example, the sightseeing attractions may be ordered based on the average rating of the sightseeing attractions. As yet another example, the sightseeing attractions may be ordered based on the price of the sightseeing attractions. In various embodiments, the ordering is based on a preferred ordering specified by the passenger or based on predetermined ordering criteria stored at backend system 116 or by application logic 218.

In various embodiments, each sightseeing attraction entry may be selectable for inclusion in a prospective schedule for the passenger's sightseeing trip. When a passenger selects an attraction entry, the attraction is added to the sightseeing trip (an attraction may also be deselected to be removed from the prospective schedule). Application logic 218 may display various information associated with the sightseeing trip. For example, such information may include a price for tickets to attend the attractions of the sightseeing trip, a price for travelling from a start location to the attractions and to a destination location via the transportation service, a total price including the travel cost and ticket price(s), one or more wait times (e.g., an estimation of how long the passenger will have to wait in line to view one or more attractions), estimated travel time for the trip and/or for travel between any two of the sightseeing attractions, estimated viewing times for the attractions, or any combination thereof. In an embodiment, a total time for the trip is displayed which may be the sum of any combination of these times (e.g., the travel times, viewing times, and/or wait times). In various embodiments, the estimated viewing times may be based on viewing times specified by others that have visited the attractions (e.g., passengers of the transportation service and/or users that have provided data to a sightseeing attraction information source), viewing times measured for others that have visited the attractions (e.g., based on records of how long others have stayed at the attractions), or viewing times explicitly specified by the passenger via application logic 218 (indicating how long the passenger desires to view particular attractions). The information associated with the trip may be obtained from data stored locally by application logic 218 or by requesting information from backend system 116 or other sightseeing attraction information source as described further below.

In various embodiments, application logic 218 may allow the passenger to enter one or more constraints and/or preferences for the trip. For example, constraints may include when and/or where the trip is to begin, when and/or where the trip is to end (e.g., the user may need to be at an airport at 5:00), a maximum travel cost for the trip, a maximum attraction cost for the trip (i.e., the maximum amount the passenger desires to spend on tickets to view the attractions), a total maximum cost for the trip, a maximum time length for the trip, visiting times for one or more attractions, a time at which the passenger is to be at a particular attraction (e.g., the passenger may be planning to eat lunch with a friend at a particular restaurant), an explicit order for one or more of the attractions (e.g., the passenger may desire to visit a waterpark after visiting all other attractions in order to avoid traveling with wet clothes), or other suitable constraints. In particular embodiments, a passenger may specify a relative priority for one or more attractions. For example, a passenger may rank multiple attractions in order of importance. As another example, a passenger may mark certain attractions as "must visit" or with a similar designation, certain attractions as "would like to visit" or with a similar designation, or with other relative priority designations. In various embodiments, the passenger may indicate one or more preferences for free or low cost attractions, minimum travel time, minimum wait time, one or more particular types of attractions, or other preferences.

In various embodiments, application logic 218 may submit selected attractions, constraints, and/or preferences to backend system 116. In various embodiments, the passenger may also explicitly or implicitly (e.g., by specifying constraints or preferences) indicate whether the passenger desires the system to select one or more attractions for viewing by the passenger. Thus, a passenger may explicitly select each attraction to be visited, a passenger may explicitly select a portion of the attractions to be visited and allow the system to propose one or more additional attractions to be visited, or a passenger may not explicitly select any attractions and may allow the system to propose all of the attractions for the trip. If the backend system 116 is proposing one or more attractions for the passenger, the backend system 116 may base the selection of the one or more attractions on the constraints and/or preferences specified by the passenger.

Once the backend system 116 has selected or otherwise determined the attractions for the trip (or in conjunction with determining the attractions for the trip), the backend system 116 may determine an order in which the attractions are to be visited. In various embodiments, the order may be based on constraints and/or preferences specified by the passenger. For example, all "must visit" attractions may be prioritized before any lower priority attractions (e.g., "would like to visit" attractions). In addition, all "would like to visit" attractions may be prioritized before other attractions with lower priority are selected. Prioritizing an attraction may include determining the order of the trip so as to ensure that as many high priority attractions as possible are visited given the constraints on the trip. In various embodiments, the order may also be selected to minimize travel time, distance, and/or price; maximize the number of attractions that may be seen (while still conforming with any time constraints specified by the passenger); or otherwise optimize the trip.

Backend system 116 may also determine information associated with the trip, such as estimated travel times, total estimated travel time, estimated wait times, total estimated wait time, estimated viewing times, total estimated viewing time, estimated cost for the attractions, total estimated cost for the attractions, estimated cost of travel segments of the trip, total estimated cost of travel for the trip, total estimated time of the trip, other suitable information associated with the trip, or any suitable combination thereof. This information is then passed back to the passenger computing device for display by application logic 218 to the passenger.

A prospective schedule may be any specification of one or more sightseeing attractions. In various embodiments, a prospective schedule may also include an ordering of the sightseeing attractions. For example, the order of the trip and associated information passed back to the passenger computing device from the backend system 116 may be termed a prospective schedule. As another example, a schedule constructed by the passenger without any selection of attractions and/or ordering of attractions by the backend system 116 may also be termed a prospective schedule. In particular embodiments, a prospective schedule may also specify a start location where the passenger is to be picked up at the beginning of the trip (e.g., the current location of the passenger's computing device 104 or a different location) and/or a final destination location where the passenger is to be dropped off when the transportation request has been completed.

The passenger may be allowed to view a prospective schedule and make changes to the schedule. For example, the passenger may rearrange attraction visitation order, remove attractions from the schedule, add attractions to the schedule, and change constraints and/or preferences. In response to one or more changes, the application logic 218 and/or backend system 116 may update the information associated with the trip. For example, backend system 116 may be contacted in response to a change or a submission of multiple changes and may determine an updated prospective schedule and accompanying information and send this data to the application logic 218.

In various embodiments, application logic 218 may allow the addition of sightseeing attractions to a prospective schedule. In one embodiment, for various attractions that may be added to the schedule, application logic 218 may display the additional time and/or cost that adding an attraction to the schedule would cause. In various embodiments, the additional time and/or cost is calculated based on the assumption that the additional attraction would be added to the schedule at the optimum order in the schedule (e.g., the attraction would be added in a location in the prospective schedule that would result in the minimum additional time and/or cost for the schedule). For example, if the attraction that may be added is located in between two attractions of the prospective schedule, the additional time and/or cost may be calculated based on an assumption that the additional attraction would be added in between the two attractions of the prospective schedule. The optimum placement of the additional attraction and the additional time and/or cost may be determined by any suitable logic, such as backend system 116 and/or application logic 218.

Once the passenger is in agreement with a prospective schedule, the passenger may submit a transportation request including the prospective schedule to the backend system 116 via application logic 218. In addition to the prospective schedule, the transportation request may include any suitable combination of the information described herein in connection with a standard transportation request that specifies a destination location rather than a sightseeing trip (e.g., driver/vehicle preferences, requested merchandise, etc.). The backend system 116 may make suitable arrangements for the trip and report back various information to the passenger. For example, any suitable details about the transportation request may be received from the backend system 116, such as identification of one or more drivers that will fulfill the transportation request, identification of one or more vehicles that will be used to fulfill the transportation request, or any other suitable information associated with the request (such as any suitable combination of the information described herein as being communicated to a passenger in connection with a standard transportation request that specifies a destination location rather than a sightseeing trip).

In some situations, a single driver may be unable to fulfill the entirety of the transportation request. In such situations, a handoff may occur in which a second driver replaces a first driver. Any suitable number of handoffs may occur during the fulfillment of a transportation request. Backend system 116 may notify the passenger (e.g., via application logic 218 or other logic) of handoffs that are to occur during fulfillment of a transportation request. Notification of the handoff may include any suitable information, such as the time the handoff will occur, where the handoff will occur, details regarding the new driver, details regarding the new vehicle, contact information of the new driver, or other suitable information that may be conveyed regarding the driver. Such information may be conveyed before the trip begins or during the trip (e.g., immediately before the handoff).

In some embodiments, the passenger may indicate via application logic 218 whether the passenger is willing to accept group transportation (i.e., a ride with one or more other passengers) to one or more attractions (which may generally result in a reduced fare). For example, the passenger may indicate a preference to receive group transportation (as a default setting or for a particular sightseeing trip) or may indicate a willingness to accept group transportation. Backend system 116 may notify the passenger via application logic 218 or other logic whether one or more segments of a sightseeing trip will be shared with other passengers. In various embodiments, application logic 218 may present a prospective schedule for a group trip to a passenger. In some embodiments, application logic 218 may present one or more predetermined group trips from which the passenger may select for a reduced fare. In various embodiments, a predetermined trip is constructed by the backend system 116 based on information obtained by the backend system 116 about the popularity of various sightseeing attractions. In some embodiments, if passengers have submitted transportation requests with one or more common sightseeing attractions, the backend system 116 may construct a group trip including the common attractions and application logic 218 may offer the group trip to a passenger for a reduced fare.

In various embodiments, application logic 218 and/or backend system 116 may facilitate the purchase of tickets to sightseeing attractions. As one example, application logic 218 may display links to ticketing websites or similar services associated with the sightseeing attractions of a transportation request. As another example, in response to generating or receiving a transportation request indicating a plurality of sightseeing attractions, application logic 218 or backend system 116 may purchase a ticket for one or more of the sightseeing attractions on the passenger's behalf and make the ticket available to the passenger (e.g., by printing the ticket or sending information associated with the ticket to the passenger computing device 104). In particular embodiments, purchase of the tickets are paced, such that a ticket is only purchased in response to an affirmative request by the passenger or in response to a detection that the sightseeing attraction is the next stop on the trip. In various embodiments, passenger application logic 218 may interface with a ticket purchasing system of a sightseeing attraction (directly or through backend system 116) thus allowing the passenger to purchase a ticket for a transportation vehicle of the secondary transportation service through application logic 218. In some embodiments, the passenger application logic 218 may (e.g., without requiring passenger input with respect to the sightseeing attraction's ticketing interface) place a ticket for sightseeing attraction into a shopping cart of the passenger. In some embodiments, funds for the ticket are paid through the same account of the passenger that is used to pay for the transportation request (or segments thereof). Application logic 218 and/or backend system 116 may also request refunds for unused tickets on behalf of the passenger if the transportation request changes and one or more sightseeing attractions are not visited.

In various embodiments, changes to the transportation request may be made during the servicing of the transportation request. For example, the passenger may change any of the sightseeing attractions, the order of the sightseeing attractions, constraints associated with the attractions or the trip, or preferences. Any of the parameters discussed above in connection with the generation of the prospective schedule and resulting transportation request may be changed during the trip. In response to changes made to the transportation request, the backend system 116 is notified, the backend system 116 makes arrangements to accommodate the changes (or informs the passenger that the changes cannot be accommodated), e.g., by reserving an additional driver or canceling a segment of the transportation request, and sends updated information about the trip (e.g., cost or time estimates) to the passenger computing device. In particular embodiments, backend system 116 may first communicate a price change and/or time estimate change for the changes to the passenger and receive authorization before making the changes and sending a confirmation to the passenger. As in the case described above where an additional attraction is added to a prospective schedule, any suitable logic may determine the optimal order in which to add an additional attraction to an existing transportation request.

In various embodiments, application logic 218 and backend system 116 may provide real time status information about the trip to the passenger. For example, the location of the passenger computing device (or one or more driver computing devices) may be tracked to show the passenger updated information on which sightseeing attractions have been visited, how close the passenger is to the next sightseeing attraction, how much time remains in the trip, or other information discussed herein in connection with the trip. In various embodiments, updated information regarding traffic conditions may be used to adjust estimated travel times. In particular embodiments, updated information regarding the busyness of sightseeing attractions may be used to adjust the wait times or viewing times associated with the attractions (e.g., such information may be obtained from other passengers or from other sources). In particular embodiments, if changing conditions make it unsuitably likely that one or more constraints associated with the trip will not be met (e.g., the passenger can't be delivered to the final destination location by the specified time), then the passenger may be notified and invited to make a change to the transportation request.

In various embodiments, audio or textual information associated with one or more sightseeing attractions is provided to the passenger via the passenger computing device or other device (e.g., a computing device in the vehicle servicing the transportation request). The audio or textual information may comprise any suitable information about the sightseeing attraction. For example, the information may include interesting characteristics about the sightseeing attraction, historical information about the sightseeing attraction, a guided tour for the sightseeing attraction, or other suitable information associated with the sightseeing attraction.

In various embodiments, the audio or textual information provided to the passenger for a particular attraction is selected from a data store including multiple files comprising the audio or textual information, where each file includes the information in a different language. The file provided to the passenger may be selected based on a language setting associated with the passenger. For example, the language setting may be specified in the application logic 218 or other logic of the passenger computing device and provided to the source of the information to be used in the selection. As another example, the language setting may be specified explicitly by the passenger in a request for the information.

The audio or textual information may be provided to the passenger computing device at any suitable time. For example, the information for all of the sightseeing attractions of a transportation request may be provided to the passenger computing device at the time of the generation of the transportation request. As another example, the information for a sightseeing attraction may be provided to the passenger computing device in response to a detection that the passenger computing device is in proximity to the sightseeing attraction (e.g., within a predefined distance). As another example, the information for a sightseeing attraction may be provided in response to a request from the passenger for the audio information. In various embodiments, audio information may be sent in a file or may be streamed to the passenger computing device.

In various embodiments, the audio or textual information may be associated with sightseeing attractions that are included in the transportation request and/or with sightseeing attractions that are viewable from (or otherwise located in proximity to) a route taken by the passenger during the servicing of the transportation request. For example, in one embodiment, information associated with a particular sightseeing attraction may be offered or presented to the passenger computing device in response to a detection that the passenger computing device is located near a particular sightseeing attraction. Thus, as the passenger is being driven from one location to another, the passenger may receive information (or offers for information which the passenger may accept in order to receive the information) about various attractions along the way in a native language of the passenger.

In various embodiments, application logic may request and receive information (e.g., ratings, reviews, descriptions, ticket prices, ticket availability, wait times, view times, or other information) associated with sightseeing attractions from backend system 116 or other sightseeing attraction information source, such as one or more servers associated with a travel information service such as TripAdvisor, Yelp, or the like. In various embodiments, some of the information received by application logic 218 regarding the sightseeing attractions may be based on information gathered in connection with passengers of the transportation service and/or users of a travel information service. For example, the information may be based on reviews, ratings, or descriptions provided by the passengers or users or other behavior associated with the passengers or users (e.g., how long the passengers or users spent at a particular attraction, how frequently a particular attraction was visited, etc.).

Application logic 218 may be logic within a standalone mobile application or could be integrated within other logic, such as a web browser or another mobile application (e.g., an application provided by a travel information service). In various embodiments, a prospective schedule could be constructed without using application logic 218 (e.g., by using an application provided by a travel information service or a web browser) and sent to the backend system 116 and then the backend system 116 could communicate further details associated with the request via application logic 218.

In a particular embodiment, a user may supply login credentials for a social network system (e.g., FACEBOOK) or other social media system (e.g., TWITTER) to the transportation service through application logic 218. The transportation service (e.g., through backend system 116) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request a ride and may relay received requests for rides to backend system 116 along with any suitable identifying information about the user to facilitate pickup by a driver.

In various embodiments of the present disclosure, in addition to any combination of the features described above with respect to the driver application, driver application logic 220 may provide additional features for the driver application to enhance the functionality of the transportation service.

In various embodiments, driver application logic 220 may allow the driver to enter an availability status, such as available, not available, or inactive, as described above. In various embodiments, driver application logic 220 may also allow the driver to enter information associated with an inactive status, such as a duration of the status, a start time of the status, or exception criteria and may transmit the status indication and any associated information to the backend system 116. The duration of the status may be indicated in any suitable manner. For example, the driver may specify a time (e.g., a finite time duration or an end time) indicating when the inactive status should end and the driver's status should return to available. Driver application logic 220 may also provide an interface for allowing the driver to specify exception criteria associated with his inactive status. When a driver enters an inactive status, the backend system 116 will withhold sending transportation requests to the driver unless the specified exception criteria is met. The driver may enter any suitable criteria and may specify which conditions and how many conditions must be met before a transportation request is sent to the driver in any suitable manner. Any suitable criteria may be specified by the driver. In one example, a criterion may be that a minimum cost (e.g., actual or expected cost) for the transportation request (or the portion of the transportation request that the driver will be servicing) must be met or exceeded. In another example, a criterion may be that a minimum average cost (e.g., actual or expected cost per unit of time) for the transportation request must be met or exceeded. In some embodiments this cost may be averaged over the time duration of the transportation request itself (or the portion of the transportation request that the driver will be servicing) or may also be averaged over additional travel time to and/or from the ride for the driver. In another example, a criterion may include a time length to be compared against an expected duration of the ride (which again may or may not also include travel to and/or from the pickup or destination location of the ride). For example, the driver may only want rides shorter than the specified time length or longer than the specified time length.

Driver application logic 220 may allow the driver to specify other information that may be used by backend system 116 to select drivers for transportation requests specifying sightseeing attractions. For example, the driver may specify a shift start time, a shift end time, a lunch or other break, a preferred work area, or one or more appointments of the driver (which may be entered through driver application logic 220 or through a calendar application accessible by driver application logic 220) which may optionally include specifications of locations associated with the appointments.

Driver application logic 220 may also provide various notifications to a driver. For example, driver application logic 220 may receive and display a notification from backend system 116 that the driver has been selected for a transportation request specifying one or more sightseeing attractions (or a portion of the transportation request). The notification may specify whether the driver has been selected to provide the initial pickup of the passenger or to participate in a passenger handoff from another driver. As another example, driver application logic 220 of a driver servicing a transportation request may receive and display a notification from backend system 116 that the passenger has changed the transportation request. In some embodiments, if an additional attraction has been added to the transportation request, the driver may respond as to whether the driver agrees to service the remainder of the request (if the driver does not agree, a handover driver may be procured). In the event of a handoff, the driver may be provided with any suitable information to facilitate the handoff, such as where the handoff is to occur, what time the handoff is to occur, identification information of the other driver or vehicle, contact information of the other driver, or other suitable information.

Driver application logic 220 may also present received navigational data to the driver to facilitate the fulfillment of transportation requests. For example, driver application logic 220 may receive navigational data from backend system 116 and navigate the driver to a pickup location, to a handoff location, to a destination location specified by the passenger, or other suitable locations (any of which may correspond to a sightseeing attraction).

In particular embodiment's driver application logic 220 may enable a driver to fulfill at least a portion of a transportation request specifying sightseeing attractions. For example, driver application logic 220 may communicate information about the driver to backend system 116 to aid the backend system in selecting a driver for such a request. The information communicated to backend system 116 may be explicitly entered by the driver or may be automatically collected (e.g., GPS measurements). In various embodiments, driver application logic 220 may allow the driver to indicate whether or not he is willing to drive passengers with requests indicating sightseeing attractions. As another example, the driver may indicate a preference level (e.g., strongly prefer, slightly prefer, neutral, slightly dislike, strongly dislike, etc.) towards such requests.

In various embodiments, driver application logic 220 or other logic of driver computing device may facilitate the presentation of audio or textual information associated with sightseeing attractions to the passenger. For example, driver application logic 220 or other logic may receive the audio or textual information at any suitable time (such as a time described above in connection with the passenger computing device receiving such information) and may send the data to a sound system or display of the vehicle that is coupled to the driver computing device for presentation to the passenger. Such embodiments may promote a higher quality of presentation and/or allow the passenger to minimize the downloading of data.

Figure 3:
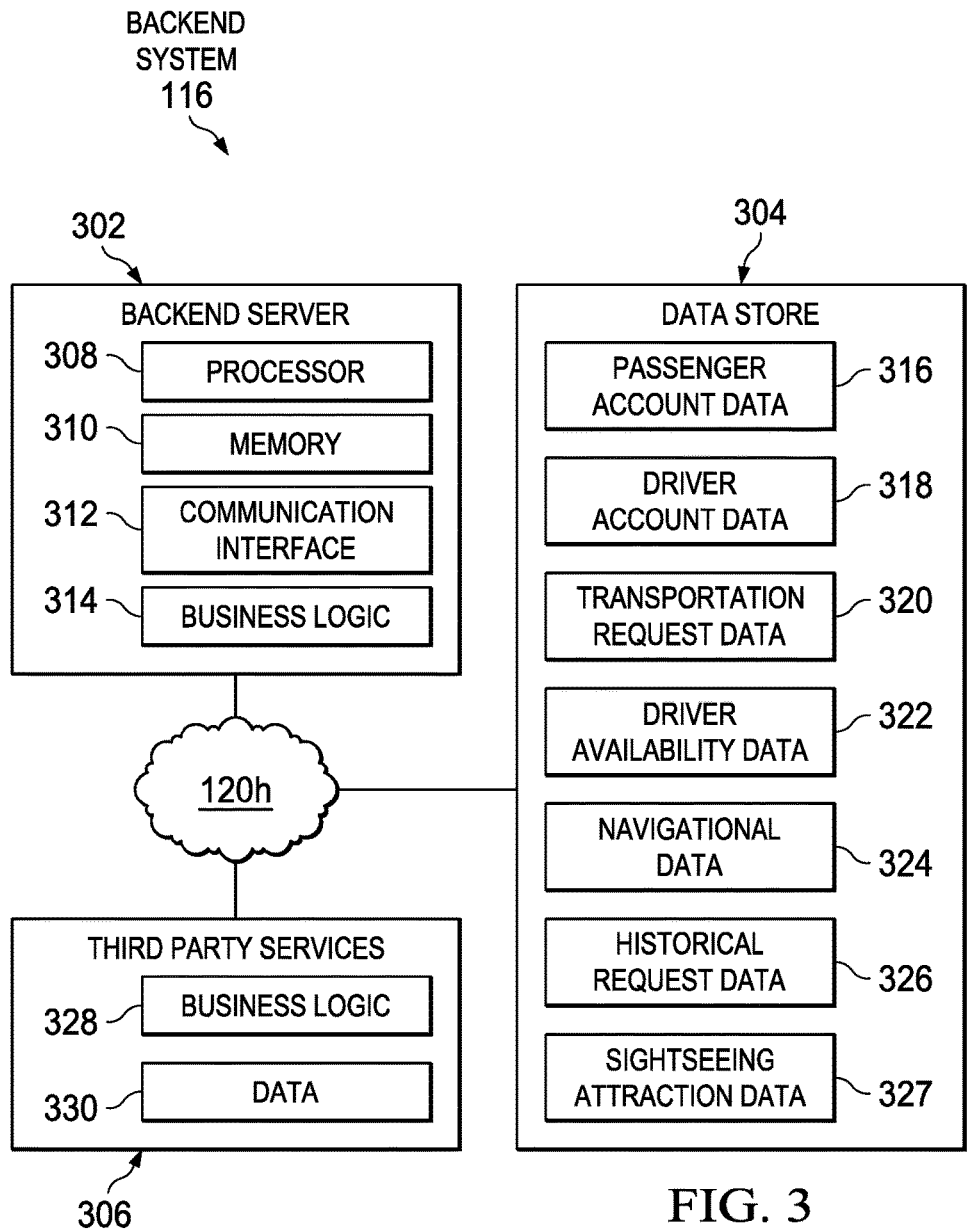
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In various embodiments, backend server 302 may be capable of performing any suitable operations herein described as being performed by backend system 116.

In the embodiment depicted, backend server 302 includes a computer system to facilitate performance of its operations. As an example, backend server 302 includes one or more processors 308, memory elements 310, and communication interfaces 312, among other hardware and software.

These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, transportation request data 320, driver availability data 322, navigational data 324, and historical request data 326. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, one or more sightseeing attractions, one or more viewing times, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, which driver (or drivers) has been assigned to a request, any other suitable information associated with a transportation request, or any suitable combination of the preceding.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information. Driver availability data 322 may also include any of the information described above that might be used by the backend system 116 in determining which driver(s) to assign to a transportation request specifying sightseeing attractions, such as a status of a driver, a preferred work location of a driver, appointments of a driver, shift start and end times, or other suitable information. In various embodiments, driver availability data 322 may store the fuel or electric power level of the vehicle of the driver based on information received from the driver. In a particular embodiment, the fuel or electric power level is sent by driver computing device 108 to backend server 302. For example, driver computing device 108 may be integrated with the vehicle and may periodically sense the fuel or electric power level of the vehicle and transmit this information to backend server 302. As another example, the driver may enter such information into driver computing device 108 which may then transmit it to backend server 302.

Navigational data 324 may comprise information supporting navigation functions provided by the passenger applications and driver passenger applications. For example, navigational data 324 may comprise a start location, a destination location, one or more sightseeing locations, and/or map data that may be sent to passenger computing devices 104 and/or driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip (or portions thereof), or other suitable information associated with the trip.

Sightseeing attraction data 327 may include any suitable information associated with sightseeing attractions. For example, for a particular attraction, the data may include a location of the attraction, one or more ratings (or an average rating) or reviews associated with the sightseeing attraction, a recommended viewing time associated with the attraction (e.g., an average time spent by other passengers or viewers at the attraction or an average of recommended viewing times specified by other passengers or viewers), an opening and/or closing time of the attraction, a cost to attend the attraction (or an indication that the attraction is free), whether tickets are available for the attraction, whether a ticket can be purchased through the application logic 218 (e.g., via an account of the passenger with the transportation service), a brief description of the attraction, one or more audio or text files associated with the attraction (which may be in various languages), or other suitable information associated with the attraction.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests. As another example, third party services 306 may provide information about sightseeing attractions.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver (or at another suitable time), the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation data (e.g., the passenger's current location or other pickup location and/or directions to the current location or other pickup location, one or more locations of sightseeing attractions and/or directions to the sightseeing attractions, a destination location and/or directions to the destination location, etc.) to the driver computing device 108 to direct the driver to the passenger's pickup location and subsequently to direct the driver to sightseeing attractions and the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). In particular embodiments, once a particular driver's portion of a transportation request is fulfilled, the backend server 302 may facilitate payment of the fare for the portion of the trip serviced by that driver. The backend server 302 may also receive ratings associated with the trip (or portion thereof) for the passenger and driver and store these ratings in data store 304.

The backend server 302 may direct the operations of the backend system 116 in providing various backend system 116 functionality described herein. For example, the backend server may compile a list of sightseeing attractions for a passenger (e.g., based on a location associated with the passenger or other filtering criteria), send the sightseeing attractions to a passenger computing device, receive a selection of one or more sightseeing attractions and/or constraints or preferences from the passenger computing device, select one or more sightseeing attractions for the trip, optimize the order of the sightseeing attractions within a trip, and/or arrange for one or more drivers to service the transportation request for the trip.

The backend server 302 may also determine information for the trip, such as an estimate of the total time required for a prospective schedule indicating a plurality of sightseeing attractions and update the estimate in response to the passenger changing the prospective schedule (e.g., by adding a sightseeing attraction to the prospective schedule or removing a sightseeing attraction from the schedule).

In various embodiments, backend server 302 may also estimate a price for the transportation request (and/or segments thereof) based upon any combination of one or more criteria, such as the estimated distance to be traveled or estimated driving time during fulfillment of the request, the general availability of drivers during the time duration of the request, the type of car requested, etc.). The estimated price may be relayed to the passenger via the passenger computing device 104.

Backend server 302 may select one or more drivers for the transportation request in any suitable manner and based upon any suitable data (such as any of the data described above used to select a driver for a standard request). In various embodiments, backend server 302 may take into account the start time, pickup location, locations of the sightseeing attractions, final destination location, or other information associated with the transportation request. In particular embodiments, backend server 302 may also take into account any suitable combination of information associated with drivers, such as current or future projected availability status (as well as exception criteria in some instances), current location, projected location (i.e., a location at which a driver is expected to be at a future time based on historical data or explicit indications from the driver), shift start time, shift end time, scheduled appointments or breaks, preferred work locations, preference levels for transportation requests specifying sightseeing attractions, driver ratings, or other suitable information associated with the drivers. In various embodiments, such information may be explicitly specified by the driver or inferred based on historical data tracked by backend server 302. In particular embodiments, the selection of the one or more drivers is based, at least in part, on a current fuel or power level or capacity. In particular embodiments, the selection may take into account a distance the driver may travel using the current or maximum fuel or power level of the vehicle). For example, a single driver may be selected based on a determination that the driver may service the entirety of the request without refueling or charging. As another example, a single driver may be selected based on a determination that the driver may service the entirety of the request because (even though the current or maximum fuel or power level of the vehicle may not be enough to service the entire request) the driver will be able to refuel or recharge during one of the scheduled stops in the transportation request without interrupting the request of the passenger. In particular embodiments, the backend server 302 may estimate when each transportation segment of the ride will begin and end and may compare this against availability data for one or more drivers to determine whether the driver will be available to service one or more segments of the transportation request.

If the backend server 302 determines that a single driver is unavailable to service the entire transportation request, it may select one or more additional drivers to help with the request and may assign portions of the request to each driver. Such a determination may be made at the time of the initial transportation request or in response to an update to the original request (e.g., a passenger may extend the time duration during the ride by adding one or more sightseeing attractions to the transportation request).

In various embodiments, a first driver is selected when the transportation request is received. After the passenger departs the vehicle of the first driver for a sightseeing attraction, the backend server 302 may select a second driver (e.g., if the first driver does not desire to wait at the sightseeing attraction). In various embodiments, the second driver may be selected based on a time at which the passenger is expected to finish at the sightseeing attraction. The time at which the passenger is expected to finish may be based on an explicit indication by a passenger of a viewing time, and explicit indication by a passenger that the passenger will be finished at a specified time (e.g., in 5 minutes), a current location of the passenger (e.g., how far the user is from a location at which the user is expected to be when finished), average viewing times of other passengers, or other suitable information. The backend server 302 may monitor the area surrounding the sightseeing attraction and may select and/or direct the second driver to the sightseeing attraction such that the second vehicle arrives at the sightseeing attraction around the time that the passenger is expected to finish. This scenario may be repeated at each sightseeing attraction.

The backend server 302 may notify the drivers they have been selected for the transportation request in any suitable manner. In one example, the backend server 302 selects a driver and notifies the driver of the assignments. In another embodiment, the backend server 302 selects a driver and queries the driver as to whether the driver accepts the assignment. In some embodiments, a driver may respond with a partial acceptance of the assignment. For example, the driver may respond that he would only be available to service a particular portion of the transportation request. For instance, the driver may indicate that he is available for the first two hours of the request or for the last three hours of the request. In response, the backend server 302 may attempt to find a different driver to accept the entirety of the request or to fulfill the portion of the request that the first driver is unable to fulfill. In some embodiments, the backend server 302 may determine from information stored in data store 304 that a particular driver may be unable to service an entire transportation request and may select one or more additional drivers and notify all drivers simultaneously of their selection. In other embodiments, the backend server 302 may notify the drivers sequentially from the first driver to the last driver. This embodiment has the advantage of allowing the backend server 302 to adjust the start and/or end times for the subsequent drivers if an earlier driver is unable to fulfill the entire slot allotted by the backend server 302.

Once the backend server 302 assigns one or more drivers to the transportation request, the backend server 302 may notify the passenger (e.g., via passenger computing device 104) that the request is confirmed and may provide any suitable information about the request, such as contact information of the driver(s), identifying information about the drivers or vehicles, information about driver handoffs (if any), or other suitable details regarding the transportation request and/or one or more drivers that will fulfill the transportation request. Such information may be also be sent in response to selection of any successive drivers later in the trip.

In particular embodiments, a handoff may be arranged in response to a determination that a handoff is needed. For example, a handoff may be initiated in response to a determination that a driver has moved (or will move due to the transportation request) outside of an assigned area or too far from a particular location (e.g., a preferred work location specified by the driver). As another example, a handoff may be arranged in response to a request from the driver to initiate a handoff. As another example, a handoff may be arranged in response to a determination that the driver will not be able to arrive on time to an appointment or a scheduled ride unless a handoff is performed. As yet another example, a handoff may be arranged in response to a detection that a vehicle servicing the transportation request has a fuel level or a battery power level below a particular threshold (or is estimated to reach the threshold in the near future as a result of the transportation request).

During the servicing of the request, if a handoff is needed, backend server 302 may facilitate a smooth transition of the passenger from a first driver to a second driver. For example, backend server 302 may select the time and/or location of the handoff so as to minimize the disruption to the passenger. For example, backend server 302 may schedule the handoff to take place during a scheduled stop of the transportation request at the location of the stop (e.g., a sightseeing attraction). As another example, backend server 302 may schedule the handoff to take place at a location that is convenient (e.g., based on the locations position relative to a highway or other road) to the passenger if the handoff is to take place while the passenger is en route to a location.

The backend server 302 may send any of the parties (e.g., either driver or the passenger) information associated with the handoff, such as the location of the handoff, the time of the handoff, navigational data associated with the handoff location, identification of the vehicles or drivers involved in the handoff, the current location of either driver or the passenger, or other suitable information associated with the handoff. Such information may be communicated to the parties at any suitable time and any number of times. For example, the information may be sent once the terms of the handoff have been decided by backend server 302. As another example, information associated with the handoff may be sent to either driver when they need to begin driving towards the handoff location. As another example, a notification that the handoff has occurred may be sent to the passenger when the handoff occurs. Accordingly, if the passenger is away from the vehicle during the handoff, the passenger is made aware of the vehicle and/or driver to which the passenger should return to resume the trip. In a particular embodiment, when a handoff occurs the backend server and/or the driver computing device 108 may prompt either or both drivers to transfer luggage from the first vehicle to the second vehicle and/or may ask for a confirmation from the driver(s) that the luggage has been transferred. In some embodiments, the prompt may be initiated by the backend server 302 sending a message to one or more of the driver computing devices 108. In some embodiments, backend server 302 may track whether the vehicle is storing luggage and only send such promptings if the vehicle is storing luggage. In a case where both vehicles are self-driven, backend server 302 may prompt the passenger at an appropriate time before the handoff occurs to move all personal items from the first vehicle to the second vehicle and/or wait from a confirmation from the passenger before the first vehicle is driven away from the passenger.

In particular embodiments, backend server 302 may arrange for group rides wherein a driver transports multiple passengers to one or more sightseeing attractions. In various embodiments, backup server 302 may arrange for group rides if passengers that form a suitable group assent to group rides. A passenger may indicate whether the passenger is willing to share a ride along with other parameters associated with sharing the ride. For example, the passenger may specify the maximum length of time the passenger is willing to wait for another passenger that will be sharing a ride. As another example, the passenger may specify the maximum number of passengers he is willing to share a ride with.

In various embodiments, backend server 302 may select prospective passengers to be presented with an offer for a group ride based on any suitable factors, such as a group trip selected by the passengers, one or more common sightseeing attractions specified by the passengers, the proximity of the current or future locations of the passengers, the proximity in time of the passengers' expected departure to a common sightseeing attraction, the passengers' indicated preference for group rides, or other factors. In various embodiments, a shared ride may be offered for a portion of a passenger's transportation request, while the remaining portion(s) are not shared.

When querying whether a passenger is willing to share a ride, the backend server 302 may communicate a discounted price of the shared ride to the passenger. The discounted price may be based on any suitable factors, such as the standard price for the ride (e.g., the price that would be charged if the passenger rode alone), the current supply of drivers with respect to the demand for drivers, the inconvenience to the passenger (e.g., as measured by the length of time the user will have to wait due to the other passenger(s)), the status of the passenger with the transportation service, or other suitable factors.

The determination by backend server 302 of whether to offer a shared ride to a passenger may be made at the time the passenger's transportation request is received or any suitable time thereafter. Since the backend server is constantly receiving additional requests, an optimal situation for a shared ride may occur at any point during the servicing of the passenger's transportation request.

Prior to the start time of the transportation request, backend system 116 may send navigational data to a driver to allow the driver to pick up the passenger at the specified pickup location at the specified start time. Backend system 116 may also send navigational data to guide the driver to any destination locations (e.g., sightseeing attractions) that the transport request specifies (or that the passenger specifies during the ride). Backend system 116 may also send navigational data to guide the driver to a handoff location if the driver is to hand off the passenger to another driver. Furthermore, backend system 116 might send the driver the location of a driver to which he is to hand off the passenger in order to facilitate a smooth handoff.

After the initial request is received (e.g., before the ride begins or sometime during the ride), backend server 302 may receive a request from a passenger computing device 104 (or from a driver computing device 108 on behalf of the passenger) to change one or more details of the transportation request.

Backend server 302 may notify driver computing device 108 of the change. If the request would result in a longer ride duration, the driver may be notified of the request to extend the duration and may be given an opportunity to accept or reject servicing the additional duration (and an additional driver may be found if he rejects the extension). In particular embodiments, backend server 302 may automatically determine (e.g., without intervention by the driver at the time of the change) based on information included in data store 304 (e.g., driver availability data 322 or other information associated with the driver) whether a driver that is servicing the last portion of the transportation request is available to service the request through the end of the extended duration of time specified in the update. In a particular embodiment, the determination of whether the driver is available to complete the entirety of the request is based on a distance between a current or projected future location of the driver (e.g., a location at which the driver will be at as a result of the transportation request) and another location associated with the driver. For example, the other location associated with the driver may be a location at which the driver is to pick up another passenger or to attend an appointment, an assigned or preferred work location associated with the driver (to ensure that the driver doesn't get too far from this location), or other suitable location. In various embodiments, the determination of whether the driver is available to complete the entirety of the request is based on an appointment or other scheduled ride of the driver. For example, if the extension would result in the driver not being able to arrive to the appointment or pick up a passenger on time, another driver may be procured. In various embodiments, the determination of whether the driver is available to complete the entirety of the request is based on a current or projected fuel level or battery power level of the vehicle (which may be referred to as a driver in the case of a self-driven car). When the driver comprises a self-driven vehicle, the fuel measurements or battery power measurements may be periodically reported from the driver to backend system 102 for use in such determinations.

In particular embodiments, if a determination is made that a driver is unable to complete the entirety of the extended duration, a determination may be made that the driver may complete a portion of the extended duration and set a handoff time accordingly. The backend server 302 may choose the handoff time based on any suitable factors, such as the availability of the driver (e.g., the backend server may determine a time that the driver should end such that the driver may make his appointment or ride on time), the availability of the driver to which the passenger will be handed off to, the projected locations of either driver (e.g., a sightseeing attraction in order to minimize disruption to the passenger), or other suitable information.

If a determination that the driver can service the transportation request through the extended duration is made, the request may be granted. If the driver is unavailable to service the request for the extended duration, the backend server 302 may attempt to arrange for another driver to which the passenger may be handed off. If an additional driver cannot be found, the request may be denied or partially granted (up to the time that the driver is no longer available) and the passenger may be notified that the driver is only able to fulfill a portion of the extended duration.

In various embodiments, backend server 302 may facilitate the provision of audio or textual information associated with sightseeing attractions to passengers. In particular embodiments, backend server 302 may retrieve the information from a data store or may request a source of the information to provide the appropriate information (e.g., in the correct language) to the passenger at the appropriate time (e.g., at the time the transportation request is received or in response to a detection that the passenger is located near or within viewing range of a particular sightseeing location).

Figure 4:
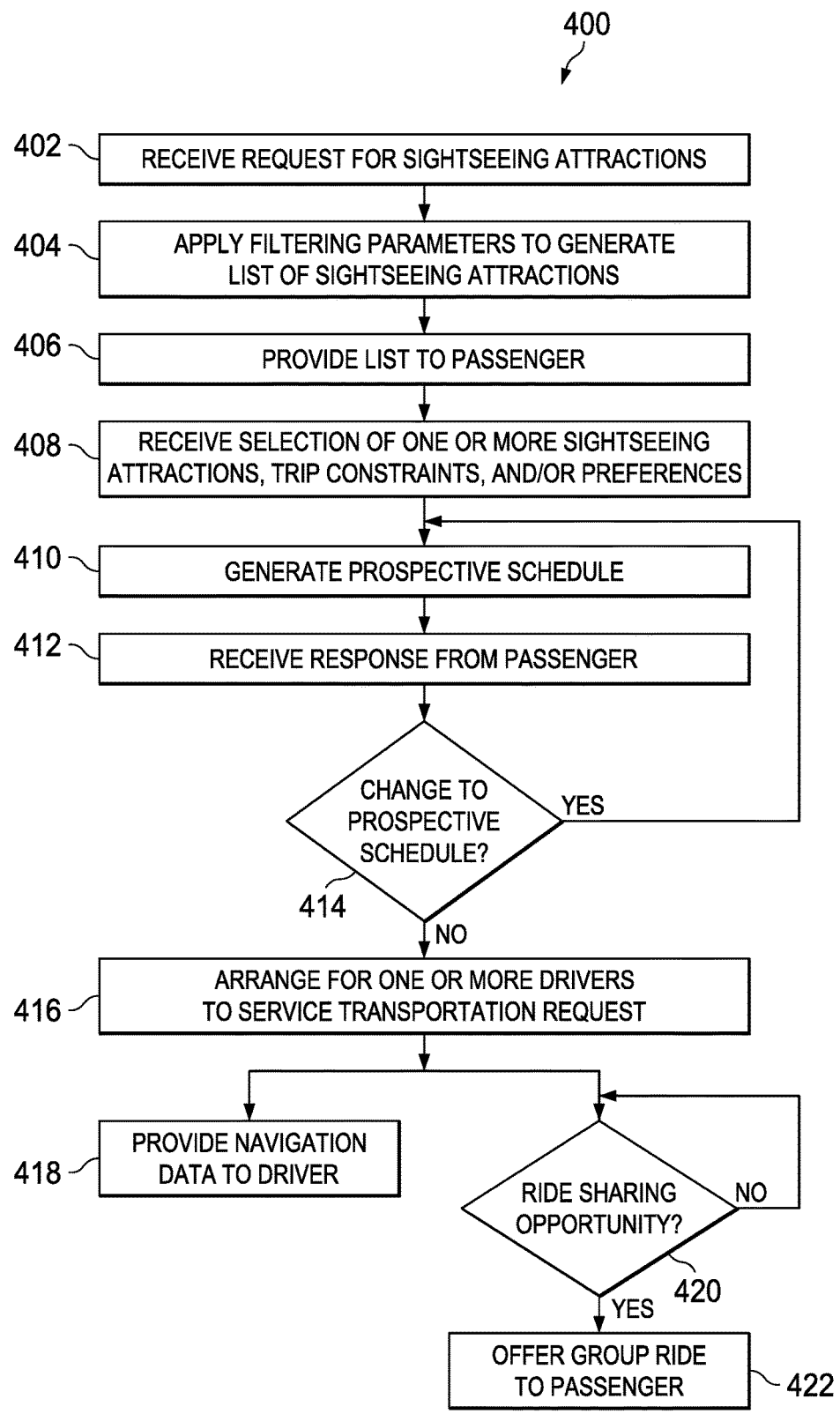
FIG. 4 illustrates a flow for navigating drivers to service transportation requests specifying sightseeing attractions in accordance with certain embodiments.

FIG. 4 illustrates a flow 400 for navigating drivers to service transportation requests specifying sightseeing attractions in accordance with certain embodiments. Various operations of flow 400 may be performed, for example, by backend server 302, third party services 306, and/or passenger computing device 104. At 402 a request for sightseeing attractions is received. At 404, one or more filtering parameters (e.g., a location associated with a passenger) are applied to a data store of sightseeing attractions to generate a list of sightseeing attractions. At 406, the list is provided to the passenger. At 408, a selection of one or more sightseeing attractions, one or more trip constraints, and/or one or more preferences are received from the passenger. At 410, a prospective schedule is generated based on the selection, constraints, and/or preferences.

At 412, a response is received from the passenger. If it is determined at 414 that the response includes a request to change the prospective schedule, then an updated prospective schedule is generated at 412 based on the request. If it is determined at 414 that the response accepts the prospective schedule (e.g., the response is a transportation request associated with the prospective schedule), then an arrangement of one or more drivers to service the transportation request is made. At 418, navigation data is provided to a driver to allow the driver to service at least a portion of the transportation request. Concurrently, it may be determined at 420 whether a ride sharing opportunity exists. For example, it may be determined whether the next attraction in the transportation request is the same attraction that another nearby passenger desires to visit. As another example, it may be determined whether multiple passengers have selected the same group trip. If no ride sharing opportunity is found, a further check for another ride sharing opportunity may be made at a later time (e.g., in connection with the following sightseeing attraction). If a ride sharing opportunity is found, a group ride is offered to the passenger and if the passenger (and the other passenger(s) sharing the ride accept), the driver may be notified to provide a group ride to the next attraction. In particular embodiments, if a ride sharing opportunity is found, backend system 116 may determine one or more times at which the passengers are to be picked up. In various embodiments, if different passengers have selected different start times for a group trip, backend system 116 may compromise between the start times in selecting the times at which the different passengers are to be picked up.

Some of the operations illustrated in FIG. 4 may be repeated, combined, modified or deleted where appropriate, and additional steps may also be included. Additionally, operations may be performed in any suitable order or concurrently without departing from the scope of particular embodiments.

Figure 5:
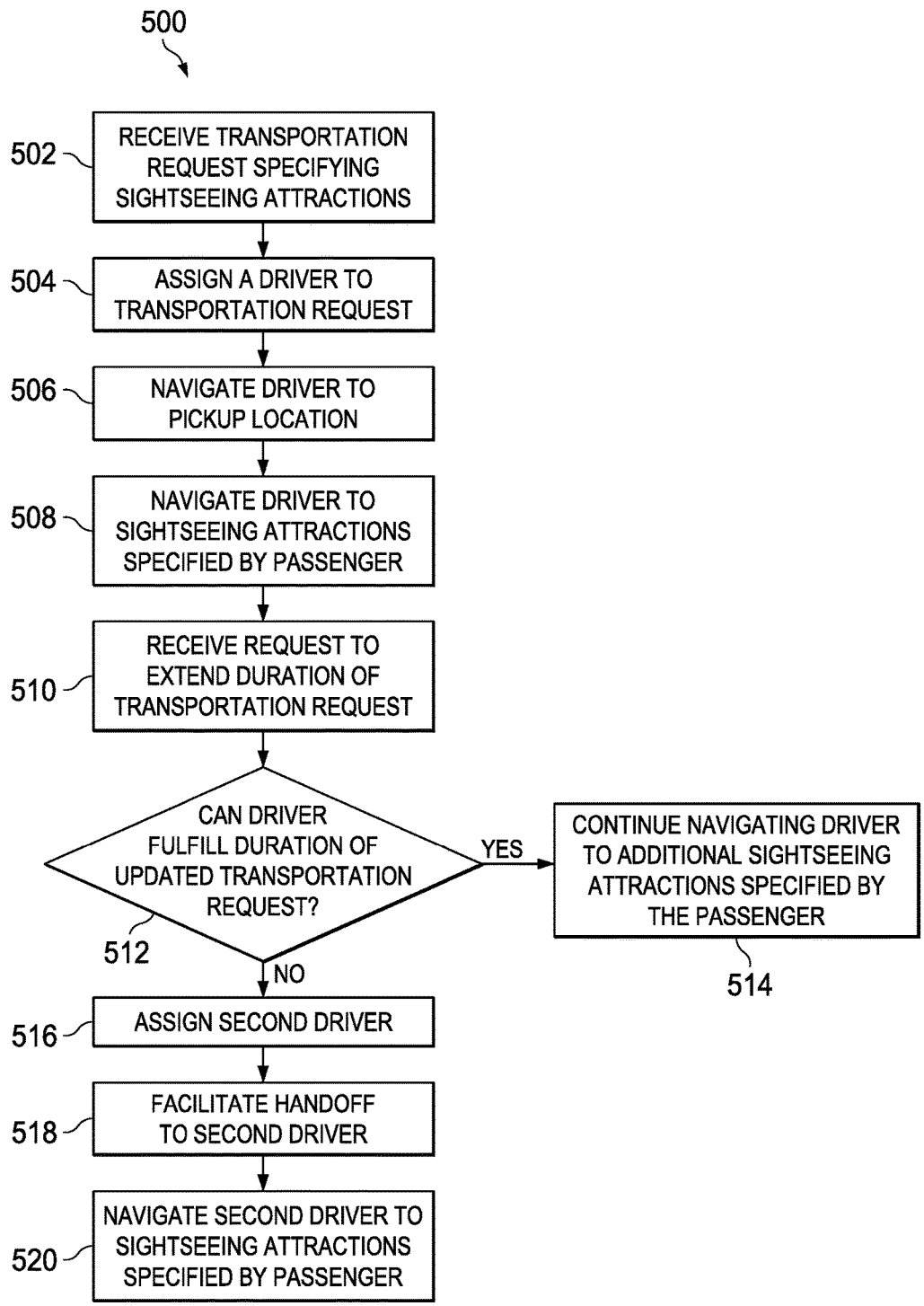
FIG. 5 illustrates a flow for accommodating a change to a transportation request specifying sightseeing attractions in accordance with certain embodiments.

FIG. 5 illustrates a flow 500 for accommodating a change to a transportation request specifying sightseeing attractions in accordance with certain embodiments. Various operations of flow 500 may be performed, for example, by backend server 302, third party services 306, and/or passenger computing device 104. At 502, a transportation request specifying sightseeing attractions is received. For example, the request may be received by backend server 302 from a passenger computing device 104. At step 504, a driver is assigned to fulfill the transportation request. The driver may be selected based on any suitable criteria such as that described above. At 506, the driver is navigated to a pickup location specified in the transportation request to pick up the passenger. At 508, the driver is navigated to one or more sightseeing attractions specified by the passenger. At any time, if backend server 302 determines that a handoff should be performed, an additional driver may be procured and the handoff facilitated.

At 510, a request is received from the passenger to extend the duration of the transportation request. For example, the request may specify one or more additional sightseeing attractions. At 512 it is determined whether the driver can fulfill the duration of the updated transportation request. If the driver can fulfill the duration of the updated transportation request, then the backend server 302 continues navigating the driver to sightseeing locations specified by the passenger at 514. If the driver cannot fulfill the duration of the updated transportation request, a second driver is assigned at 516. Backend system 116 then facilitates handoff of the passenger to the second driver at the appropriate time. The facilitation may include selecting a location and a time for the handoff and notifying the parties of details associated with the handoff. At 520, after the handoff has occurred, the second driver is navigated to one or more additional sightseeing attractions specified by the passenger until the entirety of the transportation request has been fulfilled.

Some of the operations illustrated in FIG. 5 may be repeated, combined, modified or deleted where appropriate, and additional steps may also be included. Additionally, operations may be performed in any suitable order or concurrently without departing from the scope of particular embodiments.

Figure 6:
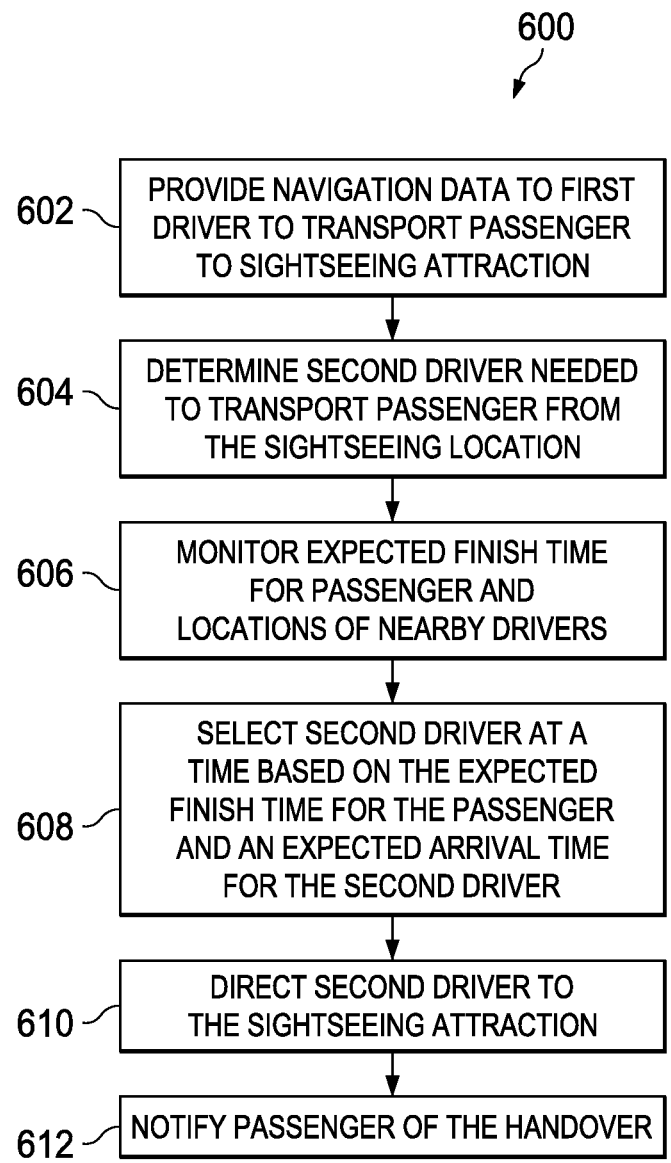
FIG. 6 illustrates a flow for performing a handoff during the servicing of a transportation request specifying sightseeing attractions in accordance with certain embodiments.

FIG. 6 illustrates a flow 600 for performing a handoff during the servicing of a transportation request specifying sightseeing attractions in accordance with certain embodiments. Various operations of flow 600 may be performed, for example, by backend server 302, third party services 306, and/or passenger computing device 104. At 602, navigation data is provided to a first driver to enable the first driver to transport a passenger to a sightseeing attraction. At 604, it is determined that a second driver is needed to transport the passenger from the sightseeing location (e.g., to the next sightseeing location or other location). For example, it may be determined that the first driver does not desire to service the next segment of the transportation request or that the first driver is otherwise unavailable to service the next segment.

At 606, an expected finish time for a passenger and locations of nearby drivers are monitored. The expected finish time may be a time at which the passenger is expected to be finished at the sightseeing attraction. In addition to monitoring the locations of nearby drivers, the amount of time that it would take the nearby drivers to arrive at the sightseeing location may also be calculated based on current or expected traffic conditions. At 608, a second driver is selected at a time that is based on the expected finish time for the passenger and an expected arrival time at the sightseeing location for the second driver. For example, the second driver may be directed to arrive at the sightseeing location a few minutes before the expected finish time. Thus, the second driver may be selected at a time that allows optimized usage of available drivers by waiting until a second driver is needed before reserving the second driver to help with the transportation request. At 610, the second driver is directed to the sightseeing attraction. At 612, the passenger is notified of the handover. For example, an identification of the driver or the driver's vehicle is provided to the passenger.

Some of the operations illustrated in FIG. 6 may be repeated, combined, modified or deleted where appropriate, and additional steps may also be included. Additionally, operations may be performed in any suitable order or concurrently without departing from the scope of particular embodiments.

It is also important to note that the flows in FIGS. 4-6 illustrate only some of the possible scenarios that may be executed by, or within, the various components of the system described herein. Some of these operations may be deleted or removed where appropriate, or these operations may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving, by a processing device of a server via a network from a computing device of a user, a request for sightseeing attractions comprising at least one time constraint and at least one relative priority for at least one sightseeing attraction;
   determining, by the processing device, a prospective schedule for the user by applying search constraints comprising the at least one time constraint and the at least one relative priority to a list of potential sightseeing attractions to limit the list to a plurality of sightseeing attractions, the prospective schedule identifying the plurality of sightseeing attractions;
   causing the computing device of the user to display information associated with the prospective schedule responsive to the request for sightseeing attractions;
   receiving, by the processing device via the network from the computing device of the user, a transportation request comprising the prospective schedule responsive to displaying of the information associated with the prospective schedule;
   selecting, by the processing device based on the transportation request comprising the prospective schedule, availability data, and proximity to the computing device of the user, a first driver to transport the user to a first sightseeing attraction of the plurality of sightseeing attractions; and
   transmitting, by the processing device via the network to a first driver computing device associated with the first driver, first navigational data to direct the first driver to transport the user to the first sightseeing attraction.

2. The method of claim 1, further comprising:
   receiving, by the processing device, a location of the computing device of the user;
   compiling, by the processing device, the list of potential sightseeing attractions based on the location of the computing device of the user; and
   transmitting the list of potential sightseeing attractions to the computing device of the user.

3. The method of claim 1, further comprising, providing audio information associated with the first sightseeing attraction of the plurality of sightseeing attractions to the computing device of the user.

4. The method of claim 3, further comprising selecting a language for the audio information from a plurality of languages based on a language setting associated with the user.

5. The method of claim 1, further comprising:
   detecting that the computing device of the user is near the first sightseeing attraction not identified in the transportation request; and
   providing information about the first sightseeing attraction to be presented to the user.

6. The method of claim 1, further comprising providing to the computing device of the user an estimate of the total time associated with for the prospective schedule and updating the estimate in response to the user adding the first sightseeing attraction to the prospective schedule.

7. The method of claim 6, wherein the estimate is based on expected sightseeing viewing times at each sightseeing attraction indicated by the prospective schedule.

8. The method of claim 7, wherein the expected sightseeing viewing times are based on average sightseeing viewing times of users associated with a transportation service.

9. The method of claim 1, further comprising, in response to receiving the transportation request, purchasing a ticket for the first sightseeing attraction identified by the transportation request on behalf of the user.

10. The method of claim 1, further comprising:
    determining that the first sightseeing attraction of the plurality of sightseeing attractions identified by the transportation request is the same as a sightseeing attraction identified by a transportation request received from a second user; and
    determining whether the user desires to share a ride with the second user to the sightseeing attraction.

11. The method of claim 1, further comprising:
    selecting, by the processing device based on the availability data, a second driver to transport the user to a second sightseeing attraction of the plurality of sightseeing attractions;
    generating, by the processing device, the first navigational data and second navigational data;
    transmitting, by the processing device via the network to a second driver computing device associated with the second driver, the second navigational data to direct the second driver to transport the user to the second sightseeing attraction of the plurality of sightseeing attractions; and facilitating a handoff of the user from the first driver to the second driver while the user is at the first sightseeing attraction of the plurality of sightseeing attractions.

12. The method of claim 1, further comprising:
receiving, in association with the transportation request, an identification of an additional sightseeing attraction from the computing device of the user;
determining an order for the transportation request that results in a minimum estimated time for the transportation request; and
communicating the order to the computing device of the user.

13. An apparatus comprising:
a memory; and
a processing device communicably coupled to the memory, the processing device to execute instructions to:
receive, via a network from a computing device of a user, a request for sightseeing attractions comprising at least one time constraint and at least one relative priority for at least one sightseeing attraction;
determine a prospective schedule for the user by applying search constraints comprising the at least one time constraint and the at least one relative priority to a list of potential sightseeing attractions to limit the list to a plurality of sightseeing attractions, the prospective schedule identifying the plurality of sightseeing attractions;
cause the computing device of the user to display information associated with the prospective schedule responsive to the request for sightseeing attractions;
receive, via the network from the computing device of the user, a transportation request comprising the prospective schedule responsive to displaying of the information associated with the prospective schedule;
select, based on the transportation request comprising the prospective schedule, availability data, and proximity to the computing device of the user, a first driver to transport the user to a first sightseeing attraction of the plurality of sightseeing attractions; and
transmit, via the network to a first driver computing device associated with the first driver, first navigational data to direct the first driver to transport the user to the first sightseeing attraction.

14. The apparatus of claim 13, wherein the processing device is further to:
receive a location of the computing device of the user;
compile the list of potential sightseeing attractions based on the location of the computing device of the user; and
transmit the list of potential sightseeing attractions to the computing device of the user.

15. The apparatus of claim 13, wherein the processing device is further to:
detect that the computing device of the user is near the first sightseeing attraction not identified in the transportation request; and
provide information about the first sightseeing attraction to be presented to the user.

16. A computer-readable non-transitory medium storing one or more instructions which, when executed by a processing device, cause the processing device to:
receive, via a network from a computing device of a user, a request for sightseeing attractions comprising at least one time constraint and at least one relative priority for at least one sightseeing attraction;
determine a prospective schedule for the user by applying search constraints comprising the at least one time constraint and the at least one relative priority to a list of potential sightseeing attractions to limit the list to a plurality of sightseeing attractions, the prospective schedule identifying the plurality of sightseeing attractions;
cause the computing device of the user to display information associated with the prospective schedule responsive to the request for sightseeing attractions;
receive, via the network from the computing device of the user, a transportation request for a sightseeing trip, wherein the transportation request comprises the prospective schedule responsive to displaying of the information associated with the prospective schedule;
select, based on the transportation request comprising the prospective schedule, availability data received from a plurality of drivers, and proximity to the computing device of the user, a first driver to transport the user to a first sightseeing attraction of the plurality of sightseeing attractions; and
transmit, via the network to a first driver computing device associated with the first driver, first navigational data to direct the first driver to transport the user to the first sightseeing attraction.

17. The computer-readable non-transitory medium of claim 16, wherein the processing device is further to:
detect that the computing device of the user is near the first sightseeing attraction not identified in the transportation request; and
provide information about the first sightseeing attraction to be presented to the user.

18. The method of claim 2, further comprising selecting the sightseeing attractions of the list from a data store of sightseeing attractions based on the location of the computing device of the user and filtering criteria associated with the user.

19. The method of claim 2, further comprising selecting the first sightseeing attraction of the list of sightseeing attractions bases on an opening time or a closing time of the first sightseeing attraction.

20. The method of claim 1 further comprising:
receiving, from the first driver computing device, an indication that the first driver has opted for automatic acceptance of transportation requests; and
assigning the first driver to the transportation request without waiting to receive acceptance from the first driver computing device.

* * * * *